United States Patent [19]

Abkowitz et al.

[11] Patent Number: 4,906,430
[45] Date of Patent: Mar. 6, 1990

[54] TITANIUM DIBORIDE/TITANIUM ALLOY METAL MATRIX MICROCOMPOSITE MATERIAL AND PROCESS FOR POWDER METAL CLADDING

[75] Inventors: Stanley Abkowitz, Lexington; Harold L. Heussi, Essex; Harold P. Ludwig, Woburn; David M. Rowell, Billerica; Stephen A. Kraus, Clinton, all of Mass.

[73] Assignee: Dynamet Technology Inc., Burlington, Mass.

[21] Appl. No.: 226,207

[22] Filed: Jul. 29, 1988

[51] Int. Cl.$^4$ .............................................. B22F 7/00
[52] U.S. Cl. .......................................... 419/6; 419/12; 419/23; 419/38; 419/60; 428/552; 428/565; 428/660
[58] Field of Search ................. 419/6, 12, 23, 38, 60; 428/552, 565, 660

[56] References Cited

U.S. PATENT DOCUMENTS

| | | | |
|---|---|---|---|
| 2,596,489 | 3/1951 | Jaffee et al. | 75/134 |
| 2,940,163 | 6/1960 | Davies | 29/182.2 |
| 3,052,538 | 9/1962 | Jech et al. | 75/175.5 |
| 3,379,522 | 4/1968 | Vordahl | 75/201 |
| 3,475,142 | 10/1969 | Abkowitz et al. | 29/192 |
| 3,672,881 | 6/1972 | Sowko, Sr. | 75/208 R |
| 3,681,037 | 8/1972 | Abkowitz et al. | 29/182.2 |
| 3,737,290 | 6/1973 | Frehn | 29/182.7 |
| 3,802,850 | 4/1974 | Clougherty | 29/182.2 |
| 4,153,483 | 5/1979 | Holzl | 428/552 |
| 4,217,141 | 8/1980 | Schrittwieser | 75/244 |
| 4,469,757 | 9/1984 | Ghosh et al. | 428/614 |
| 4,673,550 | 6/1987 | Dallaire et al. | 419/12 |
| 4,731,115 | 3/1988 | Abkowitz et al. | 75/236 |
| 4,808,485 | 2/1989 | Prewo et al. | 428/552 |

FOREIGN PATENT DOCUMENTS 2107738 5/1972 France .
1414413 11/1975 United Kingdom .

*Primary Examiner*—Stephen J. Lechert, Jr.
*Attorney, Agent, or Firm*—Finnegan, Henderson, Farabow, Garrett & Dunner

[57] ABSTRACT

A titanium-based metal matrix microcomposite material. About 1% to about 25% by weight $TiB_2$ is substantially uniformly incorporated in a titanium-based alloy matrix. The microcomposite material is formed by sintering at a temperature selected to preclude diffusion of $TiB_2$ into the matrix. The microcomposite material may be used in a process for cladding a macrocomposite structure.

2 Claims, 1 Drawing Sheet

TITANIUM DIBORIDE/TITANIUM ALLOY METAL MATRIX MICROCOMPOSITE MATERIAL AND PROCESS FOR POWDER METAL CLADDING

FIELD OF THE INVENTION

The present invention relates to powder metallurgy and, more particularly, to a titanium diboride/titanium alloy metal matrix microcomposite material and process for powder metal cladding.

BACKGROUND OF THE INVENTION

Titanium-based alloys offer a combination of properties up to moderately elevated temperatures including strength, toughness, low density, and corrosion resistance. Consequently, titanium-based alloys have been extensively used in aerospace applications as a weight-saving replacement for iron and nickel alloys in components that operate at low to moderately elevated temperatures.

To broaden the scope of applications where titanium-based alloys can be utilized, efforts have been undertaken to improve the mechanical properties of these alloys. U.S. Pat. No. 4,731,115 to Abkowitz et al., assigned to the assignee of the present application, discloses a microcomposite material in which TiC is incorporated in a titanium-based alloy matrix as a reinforcement or stiffening material by mechanically adding powder TiC to powder having a composition disposed to form a titanium-based alloy matrix. Upon being compacted and sintered at a temperature selected to preclude diffusion of the TiC into the matrix, the composite material exhibits higher hardness, higher modulus, and better wear resistance than the titanium-based alloy matrix material.

During the course of continuing developmental work, the present inventors discovered a reinforcement or stiffening material for titanium-based alloys that yields a microcomposite material having unexpectedly improved properties in comparison to the properties exhibited by the microcomposite material formed in accordance with the above-mentioned patent having TiC incorporated therein as the reinforcement material.

Accordingly, it is an object of the present invention to provide a titanium-based microcomposite material having improved mechanical properties including high tensile strength, wear resistance, high hardness, and high modulus.

An additional object of the invention is to provide a process for cladding a macrocomposite structure using the microcomposite material having improved mechanical properties.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects and in accordance with the purpose of the invention, as embodied and broadly described herein, the present invention provides a titanium diboride/titanium-based alloy metal matrix microcomposite material. The metal matrix is formed of titanium or a titanium-based alloy. About 1% to about 25% by weight, preferably about 5% to about 20% by weight, $TiB_2$ is substantially uniformly incorporated in the matrix. Preferably, $TiB_2$ is incorporated in the matrix by blending powder $TiB_2$ into powder metal disposed to form the matrix. The powder $TiB_2$ preferably has a particle size in the range from about 5 to about 100 microns and the powder metal disposed to form the matrix preferably has a particle size in the range from about 50 to about 250 microns. The blended powder metal is compacted and then sintered at a temperature selected to preclude diffusion of $TiB_2$ into the matrix, preferably 2200°–2250° F., to form the microcomposite material. When about 10% by weight $TiB_2$ is substantially uniformly incorporated in a Ti-6Al-4V matrix, the resulting microcomposite material has a room temperature tensile strength of over 150,000 psi. The invention also includes a process for cladding a macrocomposite structure using the titanium diboride/titanium-based alloy metal matrix microcomposite material.

BRIEF DESCRIPTION OF THE DRAWINGS

The accompanying drawings, which are incorporated in and constitute a part of this specification, illustrate embodiments of the invention and, together with the description, explain the principles of the invention.

DESCRIPTION OF THE PREFERRED EMBODIMENTS

Reference will now be made in detail to the present preferred embodiments of the invention, examples of which are illustrated in the accompanying drawings.

In accordance with the invention, a titanium or titanium-based metal matrix material is provided. The metal matrix material is preferably powder metal having a particle size in the range from about 50 to about 250 microns. Suitable titanium-based alloys for the metal matrix include, but are not limited to, Ti-6Al-4V, Ti-6Al-6V-2Sn, Ti-6Al-2Sn-4Zr-2Mo, Ti-10V-2Fe-3Al, and Ti-5Al-2.5Sn.

In accordance with the invention, about 1% to 25% by weight $TiB_2$ is incorporated in the metal matrix as a reinforcement or stiffening material. In a preferred embodiment, about 5% to about 20% by weight $TiB_2$ is incorporated in the metal matrix. $TiB_2$ may be substantially uniformly incorporated in the matrix by blending powder $TiB_2$ into the powder metal disposed to form the matrix. The powder $TiB_2$ preferably has a particle size in the range of from about 5 to about 100 microns.

The blended powder $TiB_2$ and powder metal matrix particles may be disposed in a mold and pressed to form a green compact using conventional powder metallurgy techniques. The compact is then sintered to form the composite material. In accordance with the invention, the compact is vacuum sintered at a temperature selected to preclude diffusion of $TiB_2$ into the matrix. The sintering temperature is preferably in the range of from about 2200° F. to about 2250° F. If desired, the microcomposite material may be further densified by hot isostatic pressing at 15,000–40,000 psi and 1650°–2300° F. for 1–4 hours.

Figure 1:
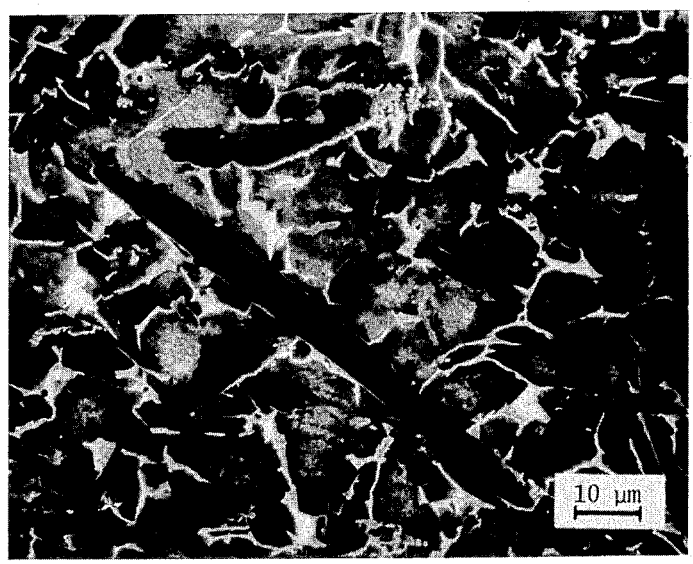
FIG. 1 is a 1000x photomicrograph of the microstructure of the microcomposite material having 10% by weight $TiB_2$ substantially uniformly incorporated in a Ti-6Al-4V alloy matrix.

FIG. 1 is a 1000x photomicrograph of the microstructure of a microcomposite material having 10% by weight $TiB_2$ incorporated in a Ti-6Al-4V alloy matrix. An unexpected feature of the microstructure is the fiber-like $TiB_2$-based particulate that extends along the diagonal of FIG. 1. It is believed that when the microcomposite material is sintered $TiB_2$ changes to TiB by short range diffusion. Thus, the sintered microstructure contains particles that are partially $TiB_2$ and partially TiB. When $TiB_2$ changes to TiB, the reinforcing particles increase in size and assume a fiber-like shape. As can be seen in FIG. 1, the fiber-like $TiB_2$-based particles have an aspect ratio greater than 4. As a result of the reinforcing particles increasing in size, the sintered microstructure contains a larger volume fraction of reinforcing particles than would be expected from the original addition.

The transformation of $TiB_2$ to TiB takes place by short range diffusion during sintering and, if the hot isostatic pressing temperature is comparable to the sintering temperature, during hot isostatic pressing because TiB is a thermodynamically stable compound that forms when $TiB_2$ and Ti are heated to elevated temperatures.

The mechanical properties of a microcomposite material containing 5% by weight and 10% by weight $TiB_2$ in a Ti-6Al-4V alloy matrix material are compared to the mechanical properties of a microcomposite material containing 10% by weight TiC in a Ti-6Al-4V alloy matrix material and monolithic Ti-6Al-4V alloy material below in Table I.

TABLE I

| Particle Addition to Ti-6Al-4V Alloy Material (% by wt.) | Ultimate Tensile Strength at Room Temperature (ksi) | 0.2% Offset Yield Strength (ksi) | Young's Modulus ($\times 10^6$ psi) |
|---|---|---|---|
| 5% $TiB_2$ | 121.2 | 112.4 | 19.1 |
| 10% $TiB_2$ | 155.8 | 155.3 | 22.3 |
| 10% $TiB_2$ (after hot extrusion) | 160.6 | 160.6 | 22.4 |
| 10% TiC | 119.0 | 118.0 | 19.2 |
| None | 130.0 | 120.0 | 16.9 |

As can be seen in Table I, the microcomposite materials formed by the addition of $TiB_2$ have increased strength and modulus in comparison with the microcomposite material formed by the addition of TiC. For example, the strength and modulus of the microcomposite material reinforced with 5% by weight $TiB_2$ are comparable to the strength and modulus of the microcomposite material reinforced with 10% TiC. The properties of the microcomposite material reinforced with 10% by weight $TiB_2$ are significantly higher than either the 10% by weight TiC-reinforced microcomposite material or the monolithic Ti-6Al-4 V alloy material. The strength and modulus of the $TiB_2$-reinforced microcomposite material can be improved by subjecting it to hot extrusion.

The present invention also includes a method of cladding a macrocomposite structure. The method includes pressing a quantity of titanium or a titanium-based alloy matrix material into a layer and then pressing a quantity of the titanium diboride/titanium-based alloy metal matrix microcomposite material into a layer on the layer of matrix material to form a multi-layered compact. Depending on the intended application of the macrocomposite structure, it may be desirable to press the titanium-based alloy matrix material onto the titanium diboride/titanium-based alloy metal matrix microcomposite material.

The layers of the titanium-based alloy matrix material and the titanium diboride/titanium-based alloy metal matrix microcomposite material may be pressed using conventional powder metallurgy techniques. These layers are preferably cold isostatically pressed at about 20,000 to 60,000 psi. Any number of desired layers may be formed by repeatedly loading and pressing alternate layers. The thickness of the layers is selected to suit the intended application.

If desired, instead of repeatedly loading and pressing alternate layers, the macrocomposite structure may be formed by simultaneously pressing alternate layers of the matrix material and the microcomposite material. In this situation, the method includes alternately disposing quantities of the matrix material and the microcomposite material, and simultaneously pressing the quantities of matrix material and microcomposite material into layers to form a multi-layered compact having at least one layer of matrix material and at least one layer of microcomposite material. The simultaneous pressing step is at about 60,000 psi.

Because the microcomposite material contains substantial amounts of the matrix material, the pressing step forming the multi-layered compact essentially presses similar powders together resulting in the formation of a mechanical bond between the layers of the multi-layered compact. Thus, the pressing step includes the step of forming a mechanical bond between the layers of the multi-layered compact.

In accordance with the invention, the multi-layered compact is then sintered at a temperature selected to preclude diffusion of $TiB_2$ into the matrix material. Sintering is accomplished using conventional powder metallurgy techniques. When the matrix material is Ti-6Al-4V, the multi-layered compact is sintered at about 2200° F. to about 2250° F. In this temperature range, there is essentially no diffusion of $TiB_2$ into the adjacent and surrounding matrix material. The diffusion which does take place is the diffusion of the Ti-6Al-4V matrix material which leaves the compositions of the respective layers of the multi-layered compact unaltered during sintering. The diffusion of matrix material only results in the formation of an integral metallurgical bond between the layer of matrix material and the layer of microcomposite material without the formation of a graduated bond between the layers. If desired, the sintered multi-layered compact may be further densified by hot isostatic pressing at the temperatures, pressures, and times described above.

Figure 2:
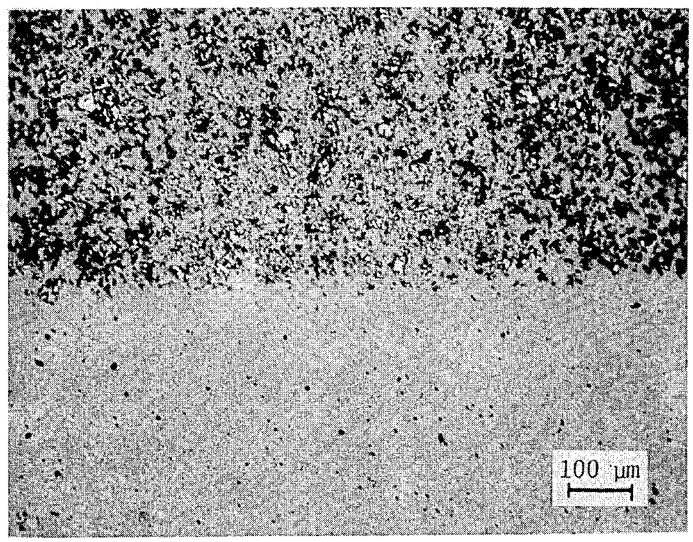
FIG. 2 is a 100x photomicrograph of the interface region between layers of microcomposite material and matrix material in a multi-layered macrocomposite article.

FIG. 2 is a photomicrograph of the interface region between a layer of matrix material and a layer of microcomposite material. In FIG. 2, the upper portion of the photomicrograph is a layer of microcomposite material and the lower portion is a layer of matrix material. As can be seen in FIG. 2, a definite line of demarcation exists between the layer of matrix material and the layer of microcomposite material and the interface region is essentially free of a composition gradient. The diffusion of matrix material only during sintering results in the stronger, harder, and stiffer microcomposite material being integrally bonded to the still intact monolithic ductile matrix material.

The method of cladding a macrocomposite structure may be used to form a variety of shapes including plates, tubes, and complex shapes such as T-sections. To make a tube, the layers of matrix material and composite material are pressed about a mandrel which yields a tubular multi-layered compact.

The present invention has been disclosed in terms of preferred embodiments. The invention is not limited thereto and is defined by the appended claims and their equivalents.

What is claimed is:

1. A method of cladding a macrocomposite structure comprising:

providing a matrix material consisting essentially of a titanium-based alloy and a microcomposite material comprised of a metal matrix consisting essentially of a titanium-based alloy, and about 1% to about 25% by weight $TiB_2$ substantially uniformly incorporated in the matrix;

selecting one of said matrix material and said composite material;

pressing the selected material to form a layer;

pressing the remaining material onto the layer of the selected material to form a multi-layered compact; and sintering the multi-layered compact to form an integral metallurgical bond between the layers of the compact with diffusion but essentially no composition gradient between the layers.

2. The method of claim 1, wherein the layers of matrix material and microcomposite material are simultaneously pressed.

* * * * *